US010450079B2

(12) United States Patent
Beutin

(10) Patent No.: US 10,450,079 B2
(45) Date of Patent: Oct. 22, 2019

(54) PROPULSIVE WING OF AN AIRCRAFT

(71) Applicant: SAFRAN AIRCRAFT ENGINES, Paris (FR)

(72) Inventor: Bruno Albert Beutin, Evry (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 239 days.

(21) Appl. No.: 15/348,838

(22) Filed: Nov. 10, 2016

(65) Prior Publication Data
US 2017/0137136 A1 May 18, 2017

(30) Foreign Application Priority Data
Nov. 13, 2015 (FR) ...................................... 15 60913

(51) Int. Cl.
B64D 27/18 (2006.01)
B64C 3/32 (2006.01)
B64C 3/34 (2006.01)

(52) U.S. Cl.
CPC ............... *B64D 27/18* (2013.01); *B64C 3/32* (2013.01); *B64C 3/34* (2013.01)

(58) Field of Classification Search
CPC .. B64C 3/32; B64C 3/34; B64D 27/00; B64D 27/18; B64D 27/12; B64D 35/04; B64D 27/16; B64D 2027/026; Y02T 50/64
See application file for complete search history.

(56) References Cited

U.S. PATENT DOCUMENTS

| 2,663,517 A | * | 12/1953 | Price | B64D 27/18 244/15 |
| 2,850,083 A | * | 9/1958 | Frost | B64D 37/04 137/576 |
| 3,054,577 A | * | 9/1962 | Wolf | B64D 27/12 244/110 B |
| 3,302,404 A | * | 2/1967 | Gist, Jr. | B64C 25/423 239/265.19 |
| 3,312,424 A | * | 4/1967 | Kappus | B64C 29/0016 244/12.5 |
| 3,383,078 A | * | 5/1968 | Shohet | B64D 37/04 244/135 R |

(Continued)

FOREIGN PATENT DOCUMENTS

GB 629143 A 9/1949

OTHER PUBLICATIONS

French Search Report with English Language Translation Cover Sheet, dated Apr. 18, 2016, French Application No. 1560913.

*Primary Examiner* — Medhat Badawi
(74) *Attorney, Agent, or Firm* — Womble Bond Dickinson (US) LLP

(57) ABSTRACT

A propulsive wing of an aircraft including at least two structural spars, upstream and downstream that extend in a wing span direction of the wing. A propulsion assembly includes at least two fans that are each driven by at least one gas generator. The at least one gas generator extends along an axis that is remote from the axis of rotation of at least one fan. At least one of the spars includes a first part and a second part between which the propulsion assembly is arranged. The first and second parts are interconnected by a rigid structure that is shaped to extend at least in part around the fans. The propulsion assembly is supported by the rigid structure.

14 Claims, 3 Drawing Sheets

(56) References Cited

U.S. PATENT DOCUMENTS

| | | | | |
|---|---|---|---|---|
| 3,390,852 | A * | 7/1968 | Miller | B64C 31/032 244/45 R |
| 3,643,439 | A * | 2/1972 | Petersen | F02K 3/12 244/15 |
| 3,820,746 | A * | 6/1974 | Vedova | B64C 29/0016 244/12.3 |
| 3,837,602 | A * | 9/1974 | Mullins | B64D 27/18 244/54 |
| 3,972,490 | A * | 8/1976 | Zimmermann | B64C 29/0016 244/12.3 |
| 4,022,405 | A * | 5/1977 | Peterson | B64C 29/0025 244/12.3 |
| 4,044,972 | A * | 8/1977 | Anker-Holth | B64C 39/06 244/12.2 |
| 4,116,405 | A * | 9/1978 | Bacchi | B64C 29/0075 244/12.4 |
| 4,296,896 | A * | 10/1981 | Kress | B64C 29/0075 244/12.4 |
| 4,469,294 | A * | 9/1984 | Clifton | B64C 29/0025 244/10 |
| 4,784,354 | A * | 11/1988 | Tavano | B64D 37/06 244/135 B |
| 4,817,382 | A * | 4/1989 | Rudolph | F02C 3/067 416/129 |
| 4,828,203 | A * | 5/1989 | Clifton | B64C 29/0025 244/12.3 |
| 4,880,071 | A * | 11/1989 | Tracy | B64C 29/0033 180/117 |
| 4,898,343 | A * | 2/1990 | Kamo | B64C 15/02 244/12.4 |
| 4,913,380 | A * | 4/1990 | Vardaman | B64D 37/04 137/263 |
| 5,054,716 | A * | 10/1991 | Wilson | B64C 29/0033 244/56 |
| 5,115,996 | A * | 5/1992 | Moller | B64C 29/0025 239/265.19 |
| 5,275,356 | A * | 1/1994 | Bollinger | B64C 29/0016 244/12.3 |
| 5,507,453 | A * | 4/1996 | Shapery | B64C 15/00 244/12.2 |
| 5,558,303 | A * | 9/1996 | Koethe | B64F 5/27 137/339 |
| 6,254,032 | B1 * | 7/2001 | Bucher | B64C 29/0033 244/12.2 |
| 6,270,037 | B1 * | 8/2001 | Freese | B64C 29/0025 244/12.3 |
| 6,607,161 | B1 * | 8/2003 | Krysinski | B64C 9/00 244/56 |
| 6,629,670 | B1 * | 10/2003 | Shah | B64C 29/0058 244/12.3 |
| 6,655,631 | B2 * | 12/2003 | Austen-Brown | B64C 27/28 244/12.4 |
| 6,843,447 | B2 * | 1/2005 | Morgan | B64C 29/0025 244/12.3 |
| 6,886,776 | B2 * | 5/2005 | Wagner | B64C 3/56 244/12.4 |
| 7,188,802 | B2 * | 3/2007 | Magre | B64C 29/0033 244/7 R |
| 7,267,300 | B2 * | 9/2007 | Heath | B64C 15/14 244/12.3 |
| 7,410,122 | B2 * | 8/2008 | Robbins | B64C 39/024 244/12.3 |
| 7,540,450 | B2 * | 6/2009 | Brand | B64D 27/14 244/54 |
| 7,677,502 | B2 * | 3/2010 | Lawson | B64C 9/18 244/207 |
| 7,857,253 | B2 * | 12/2010 | Yoeli | B64C 1/1415 244/12.3 |
| 8,015,796 | B2 * | 9/2011 | Babu | F01D 13/003 60/226.1 |
| 8,256,709 | B2 * | 9/2012 | Negulescu | B64D 27/08 244/54 |
| 9,297,270 | B2 * | 3/2016 | Suciu | F01D 15/12 |
| 9,644,537 | B2 * | 5/2017 | Suciu | F02C 3/10 |
| 9,650,954 | B2 * | 5/2017 | Suciu | F02C 3/06 |
| 9,663,239 | B2 * | 5/2017 | Suciu | F02K 1/62 |
| 9,771,863 | B2 * | 9/2017 | Suciu | F02C 3/10 |
| 9,909,495 | B2 * | 3/2018 | Suciu | F02K 3/077 |
| 10,006,361 | B2 * | 6/2018 | Bailey Noval | F02C 3/107 |
| 10,107,500 | B2 * | 10/2018 | O'Flarity | F23R 3/42 |
| 2001/0011691 | A1 * | 8/2001 | Provost | B64C 11/001 244/55 |
| 2002/0189230 | A1 * | 12/2002 | Franchet | F02K 3/025 60/204 |
| 2003/0080242 | A1 * | 5/2003 | Kawai | B64C 11/001 244/12.4 |
| 2003/0106959 | A1 * | 6/2003 | Fukuyama | B64C 27/20 244/23 R |
| 2004/0025493 | A1 * | 2/2004 | Wojciechowski | F02K 3/06 60/224 |
| 2004/0026563 | A1 * | 2/2004 | Moller | B64C 3/56 244/12.4 |
| 2005/0133662 | A1 * | 6/2005 | Magre | B64C 29/0033 244/7 R |
| 2006/0016930 | A1 * | 1/2006 | Pak | A63H 27/14 244/12.4 |
| 2009/0145998 | A1 * | 6/2009 | Salyer | B64C 27/04 244/17.23 |
| 2009/0229243 | A1 * | 9/2009 | Guemmer | B64D 27/12 60/226.1 |
| 2012/0181288 | A1 * | 7/2012 | Childress | B23P 11/00 220/586 |
| 2012/0273619 | A1 * | 11/2012 | Tichborne | B64D 39/00 244/135 A |
| 2014/0117152 | A1 * | 5/2014 | Suciu | F02K 3/06 244/54 |
| 2014/0183296 | A1 * | 7/2014 | Suciu | F02K 3/06 244/54 |
| 2014/0346283 | A1 * | 11/2014 | Salyer | B64C 37/00 244/7 A |
| 2015/0151630 | A1 * | 6/2015 | Bethea | B60K 15/03177 220/562 |
| 2016/0010589 | A1 * | 1/2016 | Rolt | F01D 13/003 60/226.1 |
| 2016/0167546 | A1 * | 6/2016 | Kim | B60L 11/1898 137/351 |
| 2016/0229532 | A1 * | 8/2016 | Shapery | B64C 29/0075 |

* cited by examiner

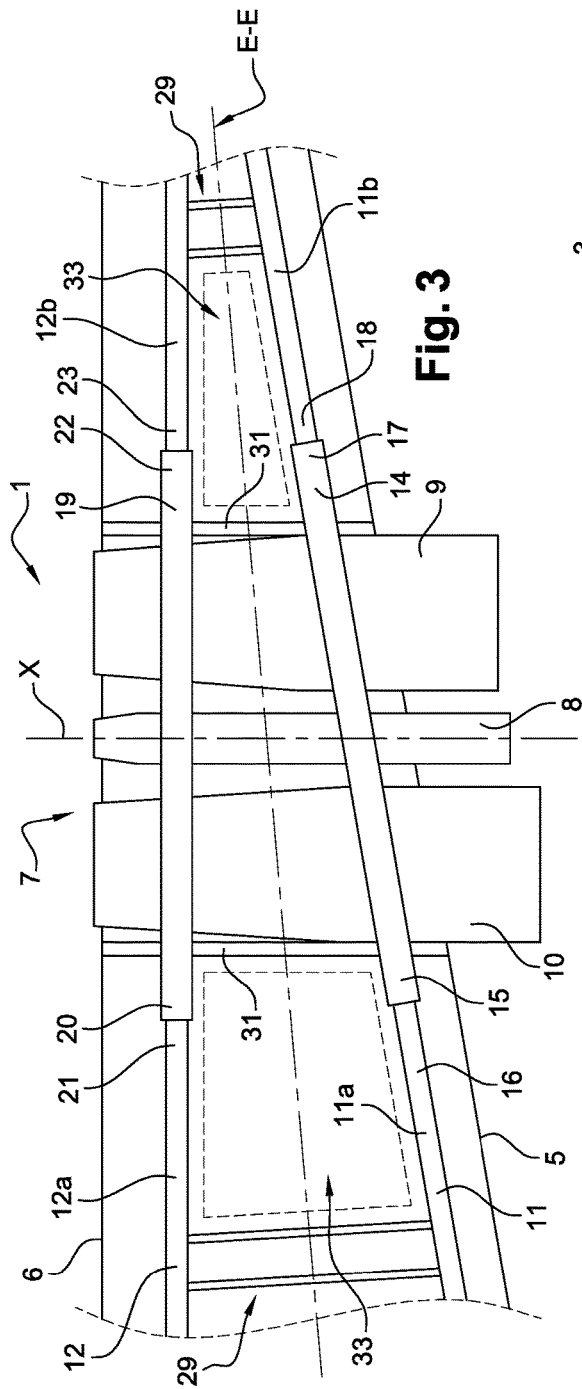
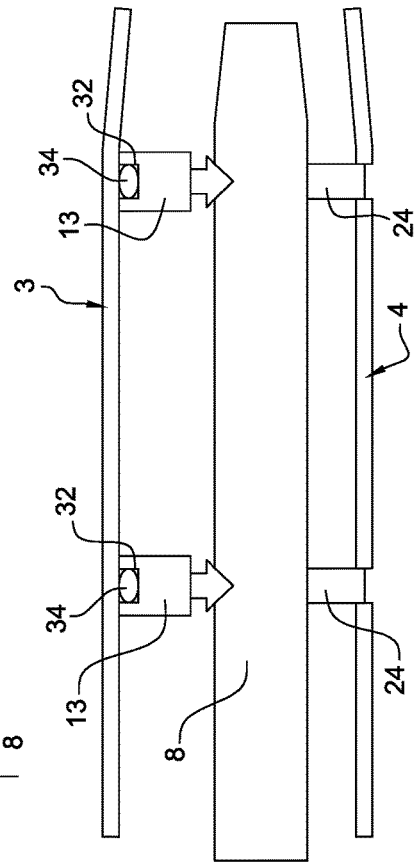

# PROPULSIVE WING OF AN AIRCRAFT

1. FIELD OF THE INVENTION

The present invention concerns the field of aeronautics and relates to a propulsive wing of an aircraft, and more particularly a wing equipped with at least one propulsion assembly formed by at least one gas generator and at least two fans. The invention also relates to an aircraft equipped with a propulsive wing of this type.

2. PRIOR ART

The natural development of multiple-flow turbojet engines that have a fan is to reduce the specific consumption while increasing the bypass ratio, which is the ratio of the secondary flow to the primary flow. In the case of conventional twin-spool bypass engines comprising one turbine connected directly to the fan, the increases in the bypass ratio are limited in particular by the difficulty in reconciling the necessary slowing in the speed of rotation of the fan and the impact of such a slowing on the increase in load and the deterioration in the performance of the low-pressure turbine. The architectures of types known as GTF (geared turbofans) such as UHBR (ultra-high bypass ratio), in which the fan rotor is driven by means of a speed reducer, partially fulfil this aim by optimising the efficiency of the turbine while allowing a reduced fan speed.

However, regardless of this aim of optimising the output of components inside the turbine engine, further increasing the bypass ratio of such engines hung beneath the wing would be restricted by the minimum ground clearance required without having a landing gear which would have an increased length compared with the prior art, as the bypass ratio is related to the flow passing into the fan and therefore to its diameter. In addition, ever-greater fan diameters, leading to ever-lower rotation speeds, would make the power transmission architecture more complex (because of the increase in the reduction ratio of the reducer) and would have a not inconsiderable impact on the weight characteristics of the engine.

In order to increase the bypass ratio of the propulsion assembly while maintaining an appropriate ground clearance for the propulsive wing of the aircraft, in the case of under-wing mounting of the propulsion assembly, a known solution consists in using an engine comprising a plurality of fans offset relative to at least one gas generator.

However, the architectures of this type of propulsion assembly entail some constraints on the drag, the operability of the aeroplane (reduction in the surface areas of the flaps arranged on the trailing edge of the wing and the mass that must be resolved:

When a propulsion assembly is positioned beneath the wing, by means of a strut, and consists for example of two fans that are offset on either side of a single gas generator, the drag phenomena produced by the nacelle are amplified. The consequence is a degradation in the performance of the engine. A propulsion assembly of this kind is described in US 2009/0229243.

In addition, the position of this assembly can lead to a reduction to iso-wing in the surface areas of the flaps, and therefore in the capacities of the aeroplane during the take-off and landing phases, which requires a longer runway.

The conventional arrangement of the propulsion assembly beneath the wing, upstream thereof, involves a suspension means that is intended to take up the forces of this propulsion assembly towards wing spars. A conventional strut is typically used and positioned between the two fans. The positioning of the centre of gravity of the propulsion assembly, relatively far upstream relative to the strut, produces a significant weight impact on the strut and also on the structure of the wing so that the strut and the wing are able to support the overhang of the propulsion assembly, and it prevents the performance of the engine assembly from being optimised. In addition, the strut is not designed to be subjected to opposing forces from the two fans which would produce a torsional moment about a vertical axis, for example when one of the two thrust reversal mechanisms fails.

It is known from FR 2 622 507 a propulsion assembly of a conventional bypass turbojet engine type hung on a beam that functions as a rib to the wing spars, this beam extending from a leading edge to a trailing edge of the wing. At least two arms connect the gas generator to the beam. This arrangement is still fairly disadvantageous in terms of aerodynamic drag and ground clearance because the propulsion assembly is still arranged beneath the wing.

3. OBJECT OF THE INVENTION

The object of the present invention is to provide a propulsive wing for an aircraft, i.e. a system consisting of a wing comprising a propulsion assembly supported by the wing, which produces a reduction in weight and in aerodynamic drag while improving the bypass ratio of the propulsion assembly and the ground clearance of this propulsion assembly.

4. DESCRIPTION OF THE INVENTION

This object is achieved according to the invention by a propulsive wing of an aircraft having at least two structural spars, upstream and downstream, that extend in a wing span direction of the wing, and a propulsion assembly comprising at least two fans each driven by at least one gas generator, at least one gas generator extending along an axis that is remote from the axis of rotation of at least one fan, and at least one of the spars comprising a first part and a second part that are separated by the propulsion assembly in the wing span direction of the wing, the first and second parts being interconnected by a rigid structure shaped so as to extend at least in part around said fans, the gas generator and the fans each being supported directly and individually by the rigid structure.

This solution thus makes it possible to achieve the object mentioned above. In particular, the wing separated by the propulsion assembly makes it possible to reduce the impact on the drag while providing a transition of forces. In fact, integrating the propulsion assembly into the wing makes it possible to minimise the surfaces that have an impact on drag, such as the fan nacelles and a strut. Furthermore, since the upper structure is fixed to the propulsion assembly, this configuration no longer requires the integration of a strut while allowing a transition of forces.

According to one feature of the invention, the gas generator and the fans each comprise a casing supported by the rigid structure by means of a suspension device that connects the casings directly and individually to said rigid structure.

According to one feature of the invention that promotes the suspension of the propulsion assembly, the rigid structure is an upper structure extending above the propulsion assembly. This configuration is also simple in design and simple to fit.

In particular, the upper structure comprises at least two profiled members to which members for suspending the fans and the gas generator are fixed.

According to one feature of the invention, the propulsive wing comprises fuel tanks arranged on either side of the propulsion assembly, and also shielding means extending in a direction substantially transverse to the wing span direction of the wing and arranged so as to protect the fuel tanks in the event of the accidental ejection of an element of the propulsion assembly, in particular the rupture of a gas generator turbine disc.

Advantageously, but not restrictively, the shielding means comprise at least two shielding plates each fixed to an end of the first part or of the second part of a spar, between the propulsion assembly and the fuel tank to be protected.

According to another advantageous feature, at least one of the shielding plates connects an upstream spar to a downstream spar and functions as a rib stiffening the wing.

According to another feature of the invention, the fuel tanks on either side of the propulsion assembly are interconnected by fuel lines that are each arranged between a profiled member of the rigid structure and an outer skin of the wing, in such a way that each fuel line is protected by the profiled member in the event of the accidental ejection of an element of the propulsion assembly.

Advantageously, but not restrictively, the fans are offset axially relative to one another so that the distance between an air inlet of a fan and the leading edge of the wing is substantially the same for all the fans.

According to another feature of the invention, the wing comprises a lower structure that is pivotably connected to at least one of the spars and forms a part of the surface of the lower surface of the wing so as to allow the maintenance of the propulsion assembly.

Advantageously, the propulsion assembly comprises two fans driven by a gas generator arranged therebetween.

According to another feature of the invention, the axes of the fans and the axes of each gas generator extend in the same plane, a space being arranged between an outer casing of a gas generator and an outer casing of an adjacent fan, and in that the upper rigid structure has at least one arm that extends into this space in order to support a locking and/or articulation device of the lower structure.

5. BRIEF DESCRIPTION OF THE FIGURES

The invention will be better understood, and its other aims, details, features and advantages will become more clearly apparent on reading the following detailed explanatory description of embodiments of the invention, given as purely illustrative and non-limiting examples, with reference to the accompanying schematic drawings, in which:

FIG. 3 is a schematic horizontal cross section of the wing of FIG. 1;

FIG. 4 is a schematic view of the propulsive wing in a vertical cross section passing through the axis X of the gas generator of FIG. 3.

6. DESCRIPTION OF EMBODIMENTS OF THE INVENTION

Figure 1:
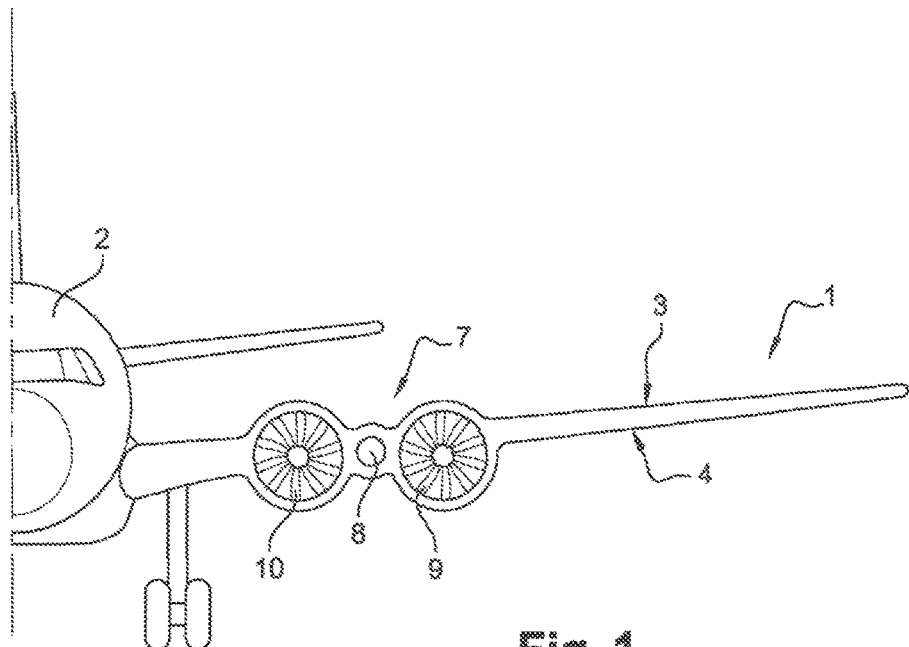
FIG. 1 is a partial view of an aircraft comprising a propulsive wing according to the invention into which a propulsion assembly comprising two fans driven by a gas generator is integrated.

FIG. 1 is a partial view of an aircraft 10, and in particular an aeroplane, comprising a fuselage 2 that extends in an elongate manner along an axis of elongation, and one of its two wings 1 or lateral lift wings connected to the fuselage 2. The wings 1 are arranged on either side of the fuselage 2. Each wing 1 extends in a wing span direction E-E from the fuselage 2 and comprises an top surface 3 called the upper surface and an opposing bottom surface 4 called the lower surface which are interconnected by a leading edge 5 upstream and a trailing edge 6 downstream of the wing 1. In the present invention, the terms "upstream" and "downstream" are defined in relation to the direction of forward movement of the aeroplane.

A propulsion assembly 7 of the propulsive wing is supported by the wing 1 shown. Of course, the opposite propulsive wing likewise supports an identical propulsion assembly 7.

This propulsion assembly 7 comprises a gas generator 8 having a longitudinal axis X that is substantially parallel to the axis of elongation of the fuselage 2, and two fans 9, 10 that are offset on either side of the axis X of the gas generator 8. The axis X of the gas generator 8 is remote from the axis of rotation of the fans 9, 10. In other words, the axis of the generator 8 that drives a fan 9, 10 is offset and remote from the axis thereof. The axes are not coaxial. The gas generator 8 comprises at least one compressor, one combustion chamber and one turbine. Said generator terminates downstream in a gas exhaust nozzle. Said generator can be single- or multiple-flow, single- or multiple-spool as required.

The offset fans 9, 10 are driven by a power transmission mechanism (not shown) coupled to a turbine shaft of the gas generator that drives them.

It should be noted that, as an alternative, the propulsion assembly can also be formed by a conventional turbine engine with the addition of at least one offset fan. In other words, such a propulsion assembly would comprise at least one fan offset in relation to the gas generator and one fan connected directly to the gas generator. The axis of the fan connected directly to the gas generator is coaxial with that of this gas generator.

Figure 2:
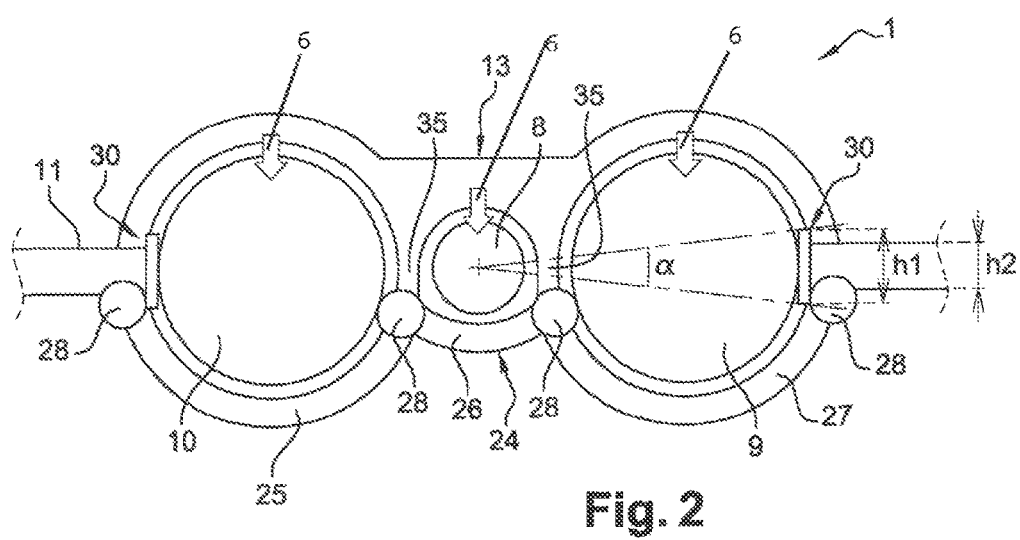
FIG. 2 is a schematic partial vertical cross section of the propulsion assembly integrated into the propulsive wing of FIG. 1.

With reference to FIGS. 2 and 3, each wing 1 comprises an upstream structural spar 11 and a downstream structural spar 12 each extending in the wing span direction E-E of the wing 1. Each wing 1 also comprises a plurality of ribs 29 that connect the upstream and downstream spars 11, 12. The upstream and downstream spars and the ribs 29 divide up spaces in which items of equipment necessary for the functioning of the aeroplane are installed. Such items of equipment include tanks 33, cabling and ducts for the supply of electrical power and fuel respectively, etc.

The propulsion assembly 7 comprising the gas generator 8 and the offset fans 9, 10 is integrated into the wing 1 of the aircraft. For this purpose, at least one of the spars comprises a first and a second part, for example substantially rectilinear, separated by the propulsion assembly 7 in the wing span direction of the wing. In FIG. 3, the upstream and downstream spars 11, 12 are each formed by a first spar part 11*a*, 12*a* and a second spar part 11*b*, 12*b*. The propulsion assembly 7 is arranged between the first parts 11*a*, 12*a* of the upstream and downstream spars and the second parts 11*b*, 12*b* of the upstream and downstream spars. In other words, each wing is divided along its wing span by the gas generator 8 and the fans 9, 10.

A rigid structure 13 is secured to at least one of the upstream and downstream spars 11, 12. This rigid structure can be formed solely by an upper structure of the wing, so as to facilitate access to the propulsion assembly 7 and to allow it to be removed via the bottom of the wing. The terms "upper" and "lower" are defined in relation to a vertical direction, the aeroplane generally being positioned substantially horizontally. This rigid structure 13 is shaped so as to extend at least in part around the fans 9, 10. In particular, this structure 13 can advantageously, but not restrictively, be welded to at least one of the upstream and downstream spars.

The upper rigid structure 13, as shown in more detail in FIG. 3, is formed in this case by an upstream profiled member 14, a first end 15 of which is fixed to an end 16 of the first part 11a of the upstream spar 11, and a second end 17 of which is fixed to a proximal end 18 of the second part 11b of the upstream spar 11. The upper structure 13 also comprises downstream profiled member 19, a first end 20 of which is fixed to an end 21 of the first part 12a of the downstream spar 12 and a second end 22 of which is fixed to a proximal end 23 of the second part 12b of the downstream spar 12. These first and second profiled members are preferably curved so as to adapt to some extent to the profile of the gas generator 8 and of the fans 9, 10 while ensuring a transition of forces in the wing.

As an alternative, at least one profiled member of the rigid structure 13 can be formed integrally with at least one of the first and second parts of an upstream or downstream spar 11, 12. It is thus assumed, in the present invention, that the propulsion assembly 7 is always arranged between a first part and a second part of a spar, and that the delimitation between a first or a second part of a spar and the rigid structure 13 is located at a point where the profile of the spar in its wing span direction has a maximum curvature.

The propulsion assembly 7 is fixed at least in part directly to the spars. In other words, and as can be seen in FIG. 2, the gas generator and the fans are each attached or hung directly and individually on the spars. The gas generator 8 is fixed directly to the upper structure 13. A "gas generator fixed directly to the spar" means that the casing of the gas generator is supported by the spar, here by the upper structure 13, by means of a suspension device 36 that connects the casing directly to the spar, i.e. without a common carrier structure such as a strut or similar mast being interposed on the path of forces between the casing and the spar. The gas generator is in particular fixed to the upstream profiled member 14 and to the downstream profiled member 19. The fans 9, 10 are also fixed directly and individually to the upstream profiled member 14 close to the leading edge 5 of the wing 1. A suspension device 36' allows the fans 9, 10 to be hung individually. These fans can, of course, also be fixed to the downstream profiled member 19.

In the example shown in FIG. 3, the fans 9, 10 are offset axially in relation to one another in such a way as to follow the sweep of the wing of the aeroplane. The outer fan 9 is offset axially relative to the gas generator 8 which is itself offset axially relative to the fan 10 which is located near the fuselage 2. Furthermore, the air inlet of the offset fans is arranged close to and upstream of the leading edge of the wing which promotes compact mounting and minimises aerodynamic disturbances.

In the example shown in FIG. 2, the gas generator 8 and the fans 9, 10 are arranged so that their axes are in a single plane so as to maintain as far as possible an aerodynamic wing profile. It is understood that, in general, the axis of a gas generator is not necessarily in the same plane as the plane formed by the axes of the fans when said fans are parallel to one another. In addition, it is not necessary for the axes of the fans to be substantially in a plane formed by the wing spars; a deviation is possible depending on the profile of the outer aerodynamic lines of the wing.

According to another aspect of the invention, a lower structure 24 is fitted to the lower part of the propulsion assembly 7. In this case, with reference to FIG. 2, the lower structure 24 comprises three parts 25, 26, 27 that can form cowls. The cowls 25, 26, 27 comprise frameworks that are pivotably connected to the wing by means of hinges 28 that can also form locking devices, the pivot pins of which are substantially parallel to the axis of the gas generator 8.

The upper rigid structure 13 here comprises arms 35 which each extend into a space arranged between an outer casing of the gas generator 8 and an outer casing of the fan 9, 10. These arms 35 support the locking and/or articulation devices of the lower structure 24. The lateral cowls 25, 27 can be pivotably connected to at least one of the first and second parts of at least one of the upstream and downstream spars 11, 12, respectively. The configuration of this lower structure 24 makes it possible to easily and rapidly access the propulsion assembly 7 to perform maintenance operations. This lower structure 24, and in particular the frameworks of the cowls 25, 26, 27, can also assist the upper rigid structure 13 in transferring some of the forces between the first and second parts of the upstream and downstream spars 11, 12.

With reference to FIG. 4, the lower structure 24 comprises some of the skin that forms the lower surface 4 of the wing 1. The lower structure 24 thus forms the lower external aerodynamic lines for the fans and the gas generator. As regards the upper structure 13, this is covered with a skin of sheet metal or composite forming a part of the surface of the upper surface 3 of the wing 1. In this way, the propulsion assembly is fitted between the surface of the lower surface and the surface of the upper surface of the wing in the vertical direction.

Easement passages 32 for the items of equipment installed in the wing 1 are provided between a profiled member 14, 19 of the upper rigid structure 13 and the upper skin of the wing, so that each essential easement, such as a fuel line 34, is protected by the profiled member 14 in the event of the accidental ejection of an element of the propulsion assembly. In particular, these essential easements, i.e. easements where damage is considered to be catastrophic for the aeroplane, absolutely must be protected in the event of the rupture of a compressor disc or a turbine disc of the gas generator, or of fan discs, even though such an occurrence is extremely rare. The loss of a fan blade that would pass through a casing of the fan is also a risk that must be taken into consideration when protecting the easement.

According to another aspect of the invention that can be seen in FIGS. 2 and 3, shielding means 30 are integrated on either side of the propulsion assembly 7 so as to protect the items of equipment installed in the wing, in particular the fuel tanks 33, during accidental ejection of an element of the propulsion assembly. These shielding means 30 comprise at least one plate that forms a cross member 31 that passes through the wing 1 from the leading edge 5 to the trailing edge 6. Each plate 31 has a predetermined height h1 which depends on an angle α of an exhaust cone that is to be protected in the event of a possible rupture of a gas generator disc. The plates 31 are made of a metal material such as steel or titanium, or an impact-resistant composite material. Said plates form at least two shielding plates that are each fixed to an end of the first part or of the second part of a spar 11 or 12, between the propulsion assembly and the fuel tank to be protected.

Figure 5:
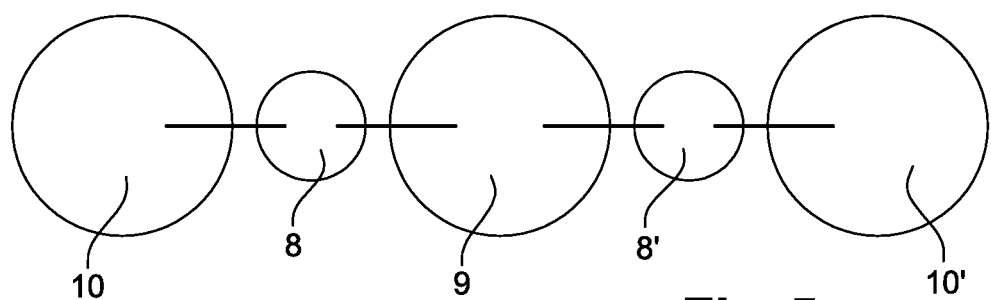
FIGS. 5 to 7 are schematic views of the arrangements of a propulsion assembly according to different embodiments.
Figure 6:
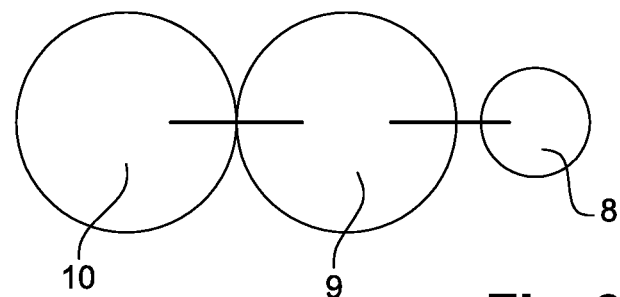
Figure 7:
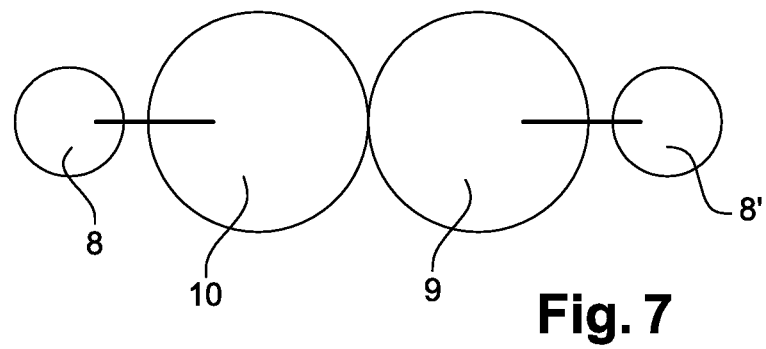

Preferably, at least one of the shielding plates 31 connects an upstream spar 11 to a downstream spar 12 and functions as a rib stiffening the wing. A plate 31 thus advantageously performs both a shielding function and a wing-stiffening function. With reference to FIGS. 5 to 7, different possible configurations of a propulsion assembly 7 may be suitable for integration into a wing in the same way as described above.

For example, according to FIG. 5, the propulsion assembly 7 comprises three fans 9, 10, 10' and two gas generators 8, 8'. The fans are arranged on either side of each gas generator 8, 8'. The two lateral fans 10, 10' are each driven by a single gas generator, while the central fan 9 can be driven by both gas generators 8, 8'. The axis of the generator 8 that drives the fan 10 is offset and remote from the axis of said fan. This also applies to the gas generator 8'.

In FIG. 6, the propulsion assembly 7 comprises two fans 9, 10 and a gas generator 8. The two fans are arranged on the same lateral side of the gas generator 8. Similarly, the axis of the generator 8 that drives the fans 9, 10 is offset and remote from the axes of said fans. The two fans can be located between the gas generator 8 and the part of the wing closest to the fuselage of the aeroplane, which is advantageous in the case of a wing having a shape of which the thickness reduces progressively from the fuselage towards the wing tip. The fan 10 furthest from the gas generator 8 can be driven by a transmission shaft connected by gears to the rotary shaft of the central fan 9.

Finally, in FIG. 7, the propulsion assembly 7 comprises two fans 9, 10 and two gas generators 8, 8'. In this example, the two fans 9, 10 are arranged between the two gas generators 8, 8' and are each driven by a dedicated gas generator. The axis of the generator 8 that drives the fan 10 is offset and remote from the axis of said fan.

It is understood that in the different possible configurations of a propulsion assembly 7, the diameters of the fans, and those of the gas generators if there is more than one, are not necessarily identical to one another.

The invention claimed is:

1. A propulsive wing of an aircraft, comprising at least two structural spars, upstream and downstream, that extend in a wing span direction of the wing, and a propulsion assembly comprising at least two fans that are each driven by at least one gas generator,
    said gas generator extending along an axis that is remote from the axis of rotation of at least one of said two fans, and
    at least one of the at least two structural spars comprises a first part and a second part that are separated by the propulsion assembly in the wing span direction of the wing, the first and second parts of at least one of the at least two structural spars being interconnected by a rigid structure that is shaped so as to extend at least in part around said fans and being an upper structure extending above the propulsion assembly
    the gas generator being supported directly and individually by the rigid structure
    and each of the two fans is supported directly and individually by the rigid structure,
    said rigid structure being free of articulation of the wing.
2. The propulsive wing according to claim 1, wherein the at least one gas generator and the fans each comprise a casing supported by the rigid structure by a suspension device that connects the casings directly and individually to said rigid structure.
3. The propulsive wing according to claim 1, wherein the rigid structure comprises at least two profiled members to which members for suspending the fans and the at least one gas generator are fixed.
4. The propulsive wing according to claim 1,
    wherein the propulsive wing comprises fuel tanks that are arranged on either side of the propulsion assembly, and
    shielding means that extend in a direction substantially transverse to the wing span direction of the wing and are arranged to protect the fuel tanks in the event of the accidental ejection of an element of the propulsion assembly.
5. The propulsive wing according to claim 4, wherein the shielding means comprise at least two shielding plates that are each fixed to an end of the first part or of the second part of a spar, between the propulsion assembly and the protected fuel tank.
6. The propulsive wing according to claim 5, wherein at least one of the shielding plates connects an upstream spar to a downstream spar and functions as a rib stiffening the wing.
7. The propulsive wing according to claim 4, wherein the fuel tanks on either side of the propulsion assembly are interconnected by fuel lines that are each arranged between a profiled member of the rigid structure and an outer skin of the wing,
    each fuel line protected by the profiled member in the event of the accidental ejection of an element of the propulsion assembly.
8. The propulsive wing according to claim 1, wherein the fans are offset axially relative to one another, so that the distance between an air inlet of a fan and the leading edge of the wing is substantially the same for all the fans.
9. The propulsive wing according to claim 2, wherein the propulsive wing comprises a lower structure that is pivotably connected to at least one of the at least two structural spars and forms a part of the surface of a lower surface of the wing.
10. The propulsive wing according to claim 1, wherein the propulsion assembly comprises two fans that are driven by a gas generator arranged between said two fans.
11. The propulsive wing according to claim 8, wherein axes of the fans and axes of each gas generator extend in a same plane,
    a space arranged between an outer casing of a gas generator and an outer casing of an adjacent fan, and
    in that the upper rigid structure has at least one arm that extends into said space in order to support at least one locking device and an articulation device of the lower structure.
12. The propulsive wing according to claim 4,
    wherein the shielding means are arranged to protect the fuel tanks in the event of the rupture of a gas generator turbine disc.
13. A propulsive wing of an aircraft, comprising at least two structural spars, upstream and downstream, that extend in a wing span direction of the wing, and a propulsion assembly comprising
    at least one gas generator, and
    at least a first fan and a second fan, each first and second fan being driven by said gas generator,
    said gas generator extending along an axis that is remote from the axis of rotation of at least one of said first and second fan, and at least one of the at least two structural spars comprises a first part and a second part that are separated by the propulsion assembly in the wing span direction of the wing, the first and second parts of at least one of the at least two structural spars being interconnected by a rigid structure that is shaped so as to extend at least in part around said fans, said rigid structure being an insert added between said first and second part of the at least one of the at least two structural spars along the wing span direction, the gas generator being supported directly and individually by the rigid structure, and each of the two fans being supported directly and individually by the rigid structure.

14. A propulsive wing of an aircraft, comprising at least two structural spars, upstream and downstream, that extend in a wing span direction of the wing, and a propulsion assembly comprising at least one gas generator, and at least a first fan and a second fan, each first and second fan being driven by said gas generator, said gas generator extending along an axis that is remote from the axis of rotation of at least one of said first and second fan, and at least one of the at least two structural spars comprises a first part and a second part that are separated by the propulsion assembly in the wing span direction of the wing, the first and second parts of at least one of the at least two structural spars being interconnected by a rigid structure that is shaped so as to extend at least in part around said fans, said rigid structure having a first end fixed to one end of the first part on one side of the propulsion assembly and a second end fixed to one end of the second part to another side of the propulsion assembly, the gas generator being supported directly and individually by the rigid structure, and each of the two fans being supported directly and individually by the rigid structure.

\* \* \* \* \*